(12) United States Patent
Toh et al.

(10) Patent No.: US 6,257,322 B1
(45) Date of Patent: Jul. 10, 2001

(54) INDIRECT HEAT EXCHANGER FILLED WITH SOLID-GAS REACTION POWDERY PARTICLES

(75) Inventors: Keiji Toh; Hidehito Kubo, both of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/625,261

(22) Filed: Jul. 25, 2000

(30) Foreign Application Priority Data

Aug. 6, 1999 (JP) .................................................. 11-224296

(51) Int. Cl.[7] .................................................. F28D 15/00
(52) U.S. Cl. .............................. 165/104.12; 165/104.11; 165/907; 62/477; 62/480
(58) Field of Search .............................. 165/104.11, 181, 165/907, 104.12, 104.26, 173, 174, 175; 62/476, 477, 480

(56) References Cited

U.S. PATENT DOCUMENTS

| 4,131,158 | * | 12/1978 | Abhat et al. ................ 165/104.26 X |
| 4,995,236 | * | 2/1991 | Halene ............................. 165/104.12 |
| 5,082,048 | * | 1/1992 | Iwaki et al. ................. 165/104.12 X |
| 5,165,247 | * | 11/1992 | Rockenfeller et al. ..... 165/104.12 X |
| 6,041,617 | * | 3/2000 | Sanada et al. .............. 165/104.12 X |

FOREIGN PATENT DOCUMENTS

| 0055855 | * | 7/1982 | (EP) | ................................ 165/104.12 |
| 0288495 | * | 12/1987 | (JP) | ................................ 165/104.12 |
| 6-281097 | | 10/1994 | (JP) | . |
| 7-330301 | | 12/1995 | (JP) | . |
| 11-30397 | | 2/1999 | (JP) | . |

* cited by examiner

Primary Examiner—Christopher Atkinson
(74) Attorney, Agent, or Firm—Morgan & Finnegan, LLP

(57) ABSTRACT

In a heat-exchange unit 1a constituting a chief portion of an indirect heat exchanger 1, the streams of hot medium that flow through many small flow passages 20 in the flat tubes 2 in the upstream heat-exchange set 5, meet together in the tubular headers 4 for each of the flat tubes 2 and, then, flow again into many small flow passages 20 in the flat tubes 2 in the downstream heat-exchange set 6. Even in case some of the small flow passages 20 are clogged or constricted, all the small flow passages 20 from the upstream common header 71 to the downstream common header 72 do not become incapable of exchanging heat and do not lose the function for exchanging heat, and most of the area of the upstream side and of the downstream side can be normally used.

3 Claims, 4 Drawing Sheets

INDIRECT HEAT EXCHANGER FILLED WITH SOLID-GAS REACTION POWDERY PARTICLES

BACKGROUND OF THE INVENTION

1. Field of the Invention

The present invention relates to an indirect heat exchanger filled with solid-gas reaction powdery particles for exchanging heat with solid-gas reaction powdery particles under an elevated pressure condition.

2. Description of the Related Art

The following literature discloses hydrogen absorbing tanks which are constituted as sealed tanks which include a hydrogen absorbing alloy powder and an indirect heat exchanger and store hydrogen gas by utilizing the hydrogen absorbing-desorbing action of the hydrogen absorbing alloy powder.

The indirect heat exchanger has heat storage medium conduits, a heat-exchanger set having many fins secured to the outer surfaces of the heat storage medium conduits to exchange heat with the hydrogen absorbing alloy powder, an inlet side header joined to the inlet side ends of the heat storage medium conduits, and an outlet side header joined to the outlet side ends of the heat storage medium conduits.

According to Japanese Unexamined Patent Publication (Kokai) No. 6-281097, the heat-exchanger, having the heat storage medium conduits and fins formed as a unitary structure through the metal-extrusion molding, is contained in a casing having a nearly square shape in cross section in a direction at right angles to the direction in which the heat storage medium conduits extend, tenons are formed at the outer ends of the fins, tenon grooves are formed in the inner surfaces of the casing, and the two are joined together by the tenons, so that the casing will not be swollen by the fins.

Japanese Unexamined Patent Publication (Kokai) No. 11-30397 discloses an indirect heat exchanger (hereinafter often referred to as a zigzag-type indirect heat exchanger) in which a heat-exchanger set is constituted by a flat tube (heat storage medium conduit) arranged in a zigzag manner in many stages in the direction of height and holding corrugated fins between the stages, and both ends of the flat tube are joined a pair of headers, respectively. The flat tube includes partitioning walls arranged at a predetermined distance in the direction of width therein, so that the interior of the flat tube is divided into many small flow passages.

Japanese Unexamined Patent Publication (Kokai) No. 7-330301 proposes an indirect heat exchanger (hereinafter often referred to as a parallel shunt-type indirect heat exchanger) in which many flat tubes are arranged in many stages in the direction of height to constitute a heat-exchanger holding corrugated fins, and both ends of the flat tube are separately joined to a pair of headers. The two headers are secured to a closure that closes the opening of a square can body having a bottom which is opened at its upper end.

With the indirect heat exchanger filled with solid-gas reaction powdery particles having the above-mentioned tenon-coupled heat-exchanger set, however, the fins must be formed with a decreased thickness and must be provided in a small number to maintain the volume for containing the hydrogen absorbing alloy powder, resulting in an increase in the heat-conducting resistance between the heat storage medium in the heat storage medium conduits and the hydrogen absorbing alloy powder. Besides, the tenons formed at the outer ends of the fins can be slid and pushed into the tenon grooves formed at the inner surfaces of the casing. This work involves difficulty when it is attempted to decrease the clearance between the two.

In the above-mentioned zigzag-type indirect heat exchanger, the flat tube is set at a right angle to the direction of transfer of the heat storage medium and develops a difference in temperature between the small flow passages, in the direction of transfer. Besides, some small flow passages may be clogged or constricted with the metal powder, spoiling or greatly deteriorating the heat-exchanging function of the small flow passages as a whole.

In the above-mentioned parallel shunt-type indirect heat exchanger, the flat tubes are extended in a horizontal direction to suppress the sedimentation of the hydrogen absorbing alloy powder and, as a result, the headers are extended in the vertical direction. When the casing is constituted by a can body and a closure plate for closing the opening, the headers are generally joined to the closure plate. Accordingly, the closure plate extends in parallel with the flat tubes, and it is not easy to fill the space between the neighboring corrugated fins with the hydrogen absorbing alloy powder to a sufficient degree through the opening in the can body.

Besides, the two headers must be wider than the flat tubes at both ends of the flat tubes. In other words, the headers have large volumes, resulting in a decrease in the volume of the casing that is to be filled with the hydrogen absorbing alloy powder.

SUMMARY OF THE INVENTION

The present invention was accomplished in view of the above-mentioned problems and its object is to provide an indirect heat exchanger filled with solid-gas reaction powdery particles, which features excellent heat-exchanging performance between a heat storage medium and solid-gas reaction powdery particles, allows its performance to be hardly deteriorated even if small flow passages in the flat tubes are constricted or clogged, and offers an increased internal volume to be filled with the solid-gas reaction powdery particles.

Another object of the invention is to reduce the weight of the indirect heat exchanger filled with the solid-gas reaction powdery particles.

The indirect heat exchanger filled with solid-gas reaction powdery particles of the present invention comprises:
an indirect heat exchanger which includes:
a heat-exchange unit constituted by an upstream heat-exchange set having many flat tubes in many stages in the direction of height, said many flat tubes forming many small flow passages independently of one another and extending in the back-and-forth direction, and having fins extending in the back-and-forth direction while maintaining a predetermined gap among said flat tubes neighboring up and down, and a downstream heat-exchange set, having the same structure as said upstream heat-exchange set, which is arranged close to the side of said upstream heat-exchange set in the direction of width;
many tubular headers extending in the direction of width neighboring the ends on one side of said flat tubes to connect ends on one side of the pairs of the flat tubes at positions of equal heights of said two heat-exchange sets, and are arranged in the up-and-down direction maintaining a predetermined gap;
an upstream common header for commonly connecting the ends on the other side of said flat tubes of said upstream heat-exchange set; and a downstream common header for commonly connecting the ends on the other side of said flat tubes of said downstream heat-exchange set;

a sealed casing containing at least said heat-exchange unit and tubular headers of said indirect heat exchanger, and having an inner peripheral edge and an outer peripheral edge formed nearly in a rectangular shape in cross section in a direction at a right angle with the back-and-forth direction;

solid-gas reaction powdery particles filled in said sealed casing; and gas-transport tubes extending back-and-forth among said neighboring flat tubes penetrating through the end walls of said sealed casing in the back-and-forth direction to transport a gas that reacts with said solid-gas reaction powdery particles.

The present invention may be more fully understood from the description of preferred embodiments of the invention set forth below, together with the accompanying drawings.

DESCRIPTION OF THE PREFERRED EMBODIMENT

Figure 1:
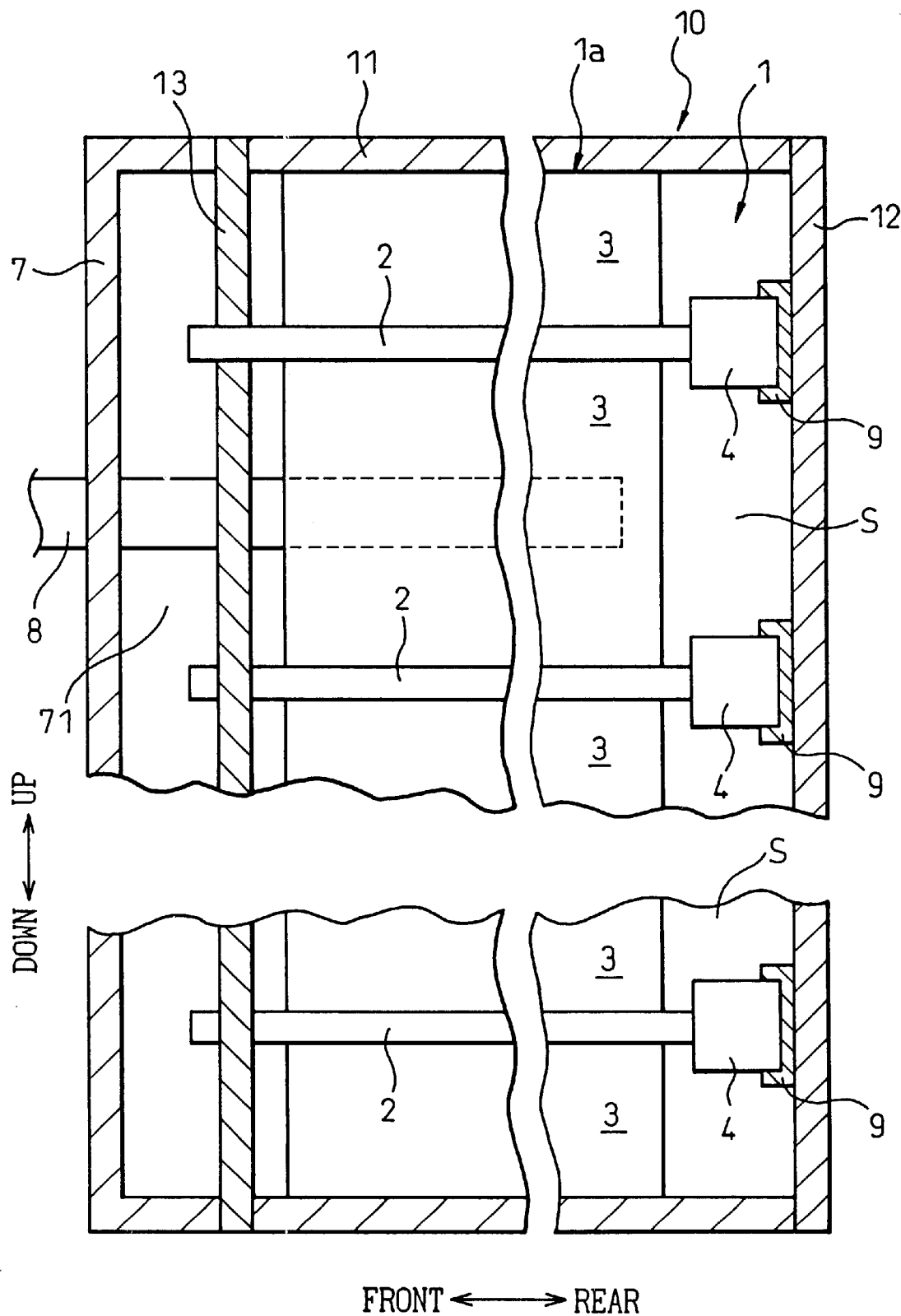
FIG. 1 is a vertical sectional view schematically illustrating, in the back-and-forth direction, a hydrogen absorbing indirect heat exchanger according to an embodiment of the present invention.

A preferred embodiment of the invention will now be described.

A hydrogen occluding indirect heat exchanger which is the indirect heat exchange filled with solid-gas reaction powdery particles of the invention will now be described with reference to the drawings.

The hydrogen absorbing indirect heat exchanger is constituted by an indirect heat exchanger 1 having a heat-exchange unit 1a, a sealed casing 10, and a hydrogen absorbing alloy powder (solid-gas reaction powdery particles), not shown, filled in the sealed casing 10.

The indirect heat exchanger 1 has flat tubes 2, corrugated fins 3, tubular headers 4, an upstream heat-exchange set 5, a downstream heat-exchange set 6, a common header 7, and gas-transport tubes 8. The upstream heat-exchange set 5 and the downstream heat-exchange set 6 constitute the heat-exchange unit 1a.

The flat tubes 2 extend back and forth forming many independent small flow passages 20 arranged in line in the right-and-left direction, and have corrugated fins 3 brazed onto the upper surface and the lower surface thereof. The corrugated fins 3 have many fins extending in the back-and-forth direction and in the up-and-down direction, and each fin has a louver cut therein to allow hydrogen to pass in the transverse direction.

Figure 3:
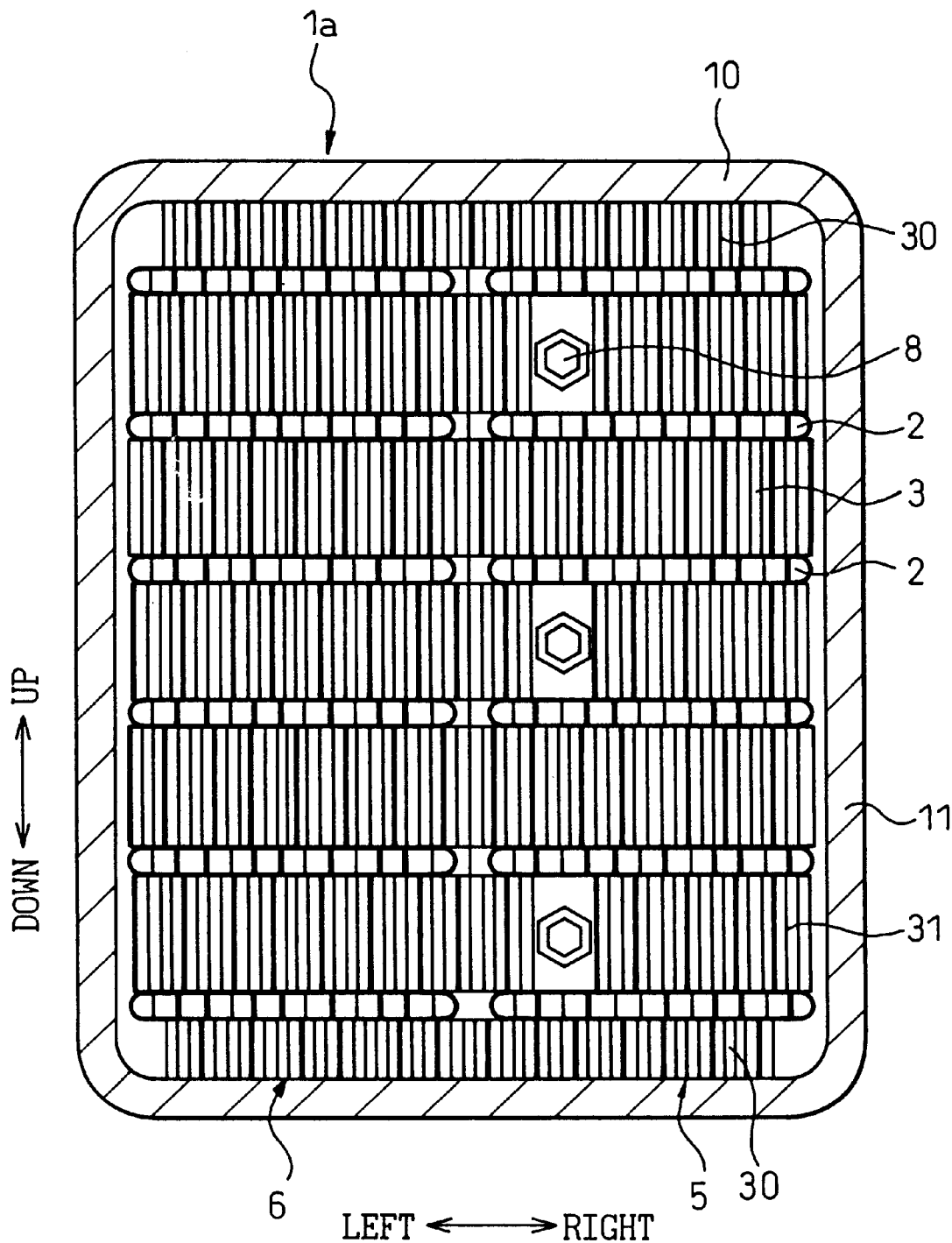
FIG. 3 is a vertical sectional view of the hydrogen absorbing indirect heat exchanger of FIG. 1 in the right-and-left direction.

Referring to FIG. 3, each of the upstream heat-exchange set 5 and the downstream heat-exchange set 6 has six flat tubes 2 and seven corrugated fins 3 alternatingly arranged in the direction of height. In FIG. 3, the downstream heat-exchange set 6 is arranged in the same direction on the left of the upstream heat-exchange set 5 maintaining a predetermined gap. Among the corrugated fins 3, the corrugated fins 30 of the uppermost stage and of the lowermost stage have a height in the up-and-down direction one-half that of the corrugated fins 30 of the intermediate stages.

Figure 2:
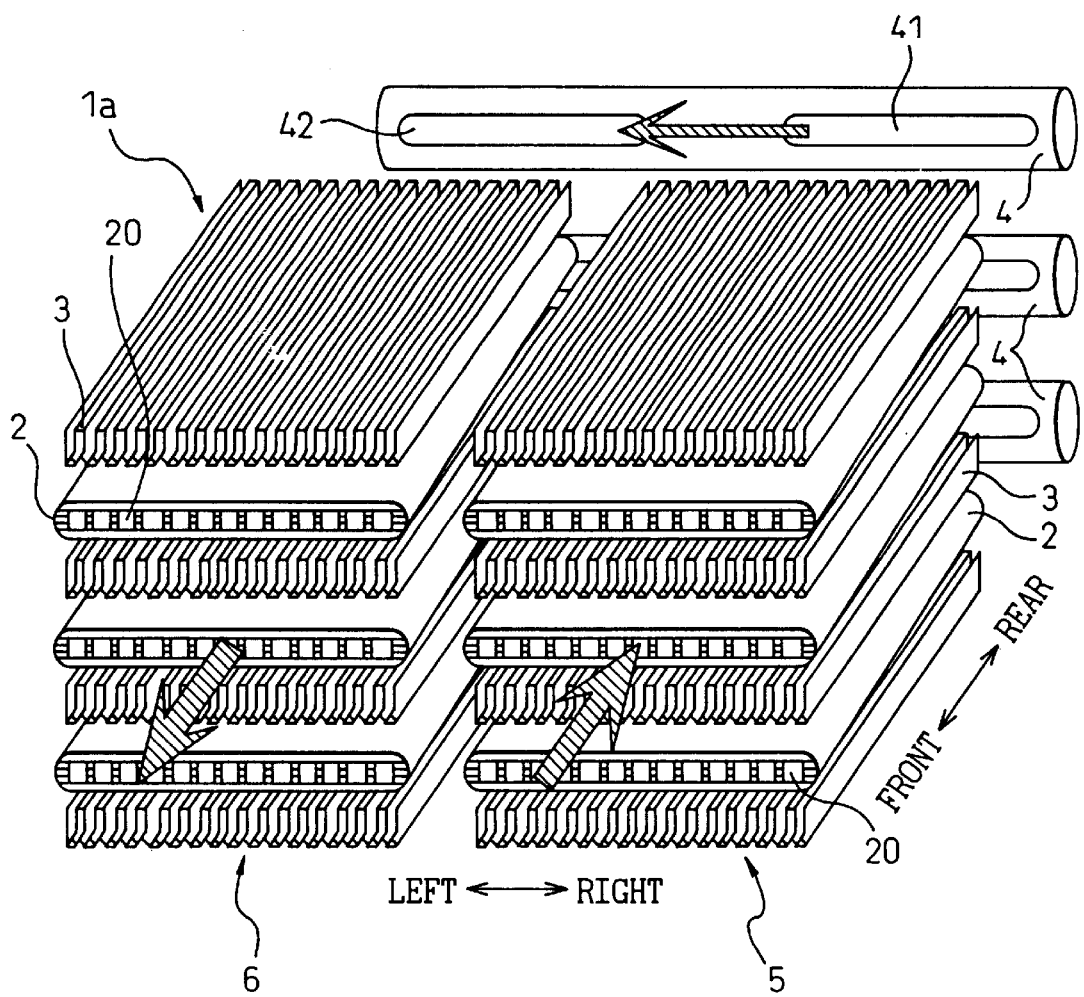
FIG. 2 is a perspective view illustrating a portion of a heat-exchange unit of FIG. 1.

The tubular headers 4 extend in the direction of width (right-and-left direction) neighboring the rear ends of the flat tubes 2, and connect the rear ends of pairs of flat tubes 2 at positions of equal heights of the two heat-exchange sets 5 and 6. Therefore, a total of six tubular headers 4 are provided, and a predetermined gap is maintained among the tubular headers 4. FIG. 2 illustrates only some of the flat tubes 2 and the corrugated fins 3.

In further detail, with reference to FIG. 2, the tubular headers 4 are provided with openings 41 in which will be inserted the flat tubes 2 of the upstream heat-exchange set 5, and with openings 42 in which will be inserted and brazed the flat tubes 2 of the downstream heat-exchange set 6. Both ends of the tubular headers 4 are closed with plugs that are not shown.

The sealed casing 10 has a square cylindrical portion 11 of a nearly square cylindrical shape formed by extrusion-molding an aluminum alloy (e.g., A7N01 as specified by JIS (Japanese Industrial Standards)), a closure plate 12 that is TIG-welded to the rear end thereof to close the opening at the rear end of the square cylindrical portion 11, and a closure plate 13 welded to the front end of the square cylindrical portion 11 to close the opening at the front end of the square cylindrical portion 11.

Figure 4:
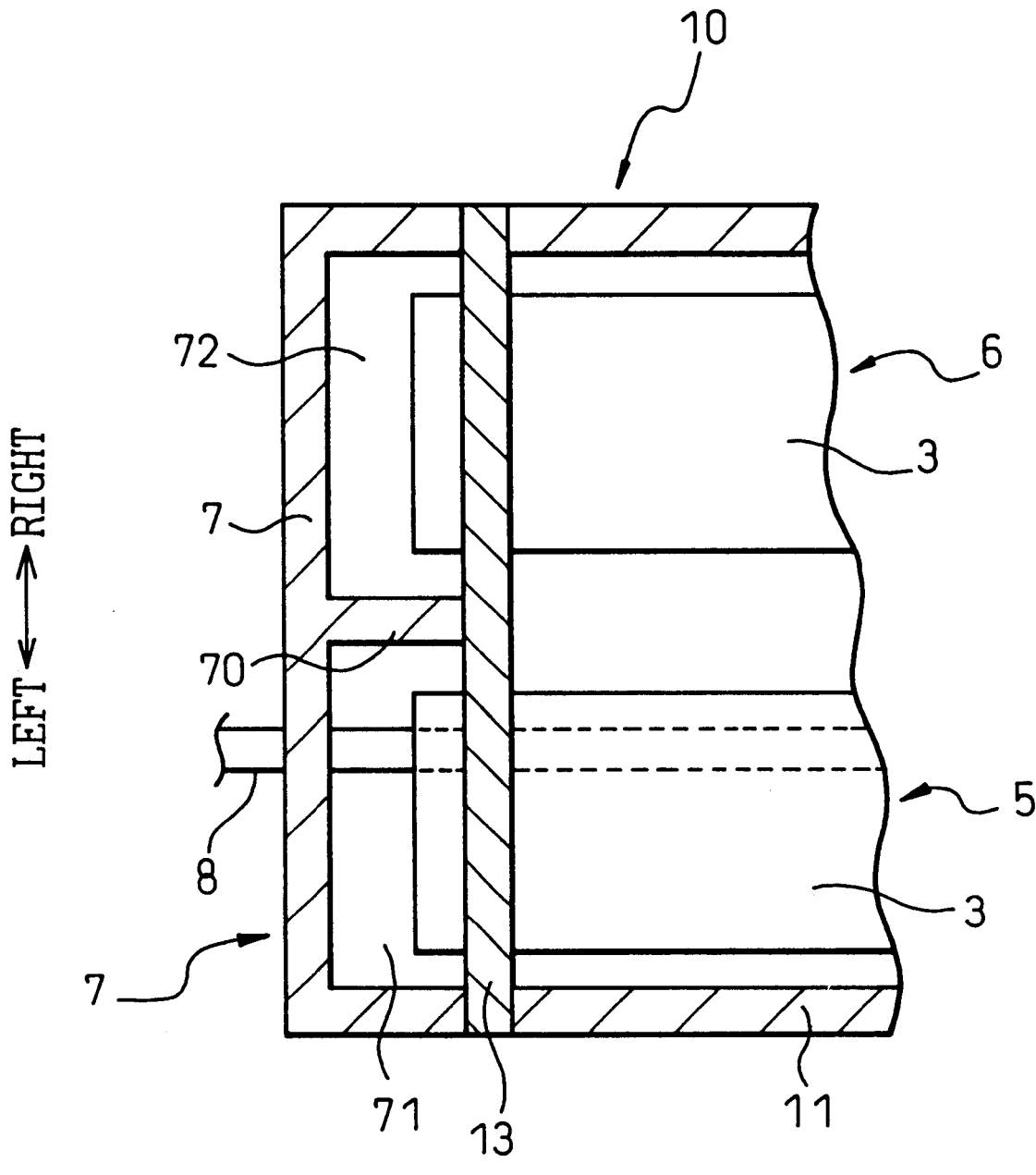
FIG. 4 is a horizontal sectional view illustrating the vicinity of a common header of FIG. 1.

The common header 7 is a square can having a shallow bottom welded to the whole circumference of the closure plate 13 so as to cover the closure plate 13, and is formed of die cast aluminum. Referring to FIG. 4, the common header 7 has a partitioning wall 70 at a central portion in the right-and-left direction. A closed space defined by the common header 7 and the closure plate 13 is divided by the partitioning wall 70 into two in the right-and-left direction, thereby to form closed space forming an upstream common header 71 and a downstream common header 72 that are referred to in the present invention.

The gas-transport tube 8 is a porous ceramic filter tube formed of a sintering ceramic, and is connected to an external hydrogen pipe that is not shown. Reference numeral 9 denotes holder plates, for holding the tubular headers 4 in the up-and-down direction, which are welded onto the inner surface of the closure plate 12.

Described below are the steps of assembling the apparatus.

The closure plate 13 having holes for the flat tubes 2, the common header 7 and the square cylindrical portion 11 are welded together to form a square can body. The heat-exchange unit 1a is accommodated in the square can body, and the ends of the flat tubes 2 are inserted in the holes through which the flat tubes 2 are to be passed.

Next, the hydrogen absorbing alloy powder is permitted to fall among the fins of the corrugated fins 3 through gaps among the tubular headers 4 and through gaps between the tubular headers 4 and the peripheral walls of the square cylindrical portion 11, and fills the square can body.

Then, the closure plate 12 is welded onto the square cylindrical portion 11 to form the sealed casing 10.

The upstream common header 71 and the downstream common header 72 in the common header 7 are separately connected to the flat tubes 2 through pipes that are not shown.

The operation will be described next.

A hydrogen gas transported into the sealed casing 10 through the gas-transport tubes 8 is absorbed by the hydrogen absorbing alloy powder which, then, generates heat. The heat is conducted to the heat storage medium in the flat tubes 2 through the corrugated fins 3 and flat tubes 2. The heat storage medium transports heat to an external unit from the upstream common header 71 through the flat tubes 2 of the upstream heat-exchange set 5, tubular headers 4, flat tubes 2 of the downstream heat-exchange set 6 and downstream common header 72.

As the hydrogen gas is transported out of the sealed casing 10 through the gas-transport tubes 8, the hydrogen absorbing alloy powder desorbs the hydrogen gas, whereby the hydrogen absorbing alloy powder absorbs heat which is then transmitted to the heat storage medium in the flat tubes 2 through the corrugated fins 3 and flat tubes 2. The sealed casing 10 has an internal pressure of several atmospheres during the operation, but can be designed to withstand a pressure several times as great as the above pressure to maintain safety.

According to the indirect heat exchanger 1 of this embodiment, the streams of heat storage medium that flow through many small flow passages 20 in the flat tubes 2 in the upstream heat-exchange set 5, meet together in the tubular headers 4 for each of the flat tubes 2 and, then, flow again into many small flow passages 20 in the flat tubes 2 in the downstream heat-exchange set 6.

Therefore, even if some of the small flow passages 20 are clogged or constricted, the whole small flow passages 20 from the upstream common header 71 to the downstream common header 72 do not become incapable of exchanging heat and do not lose the function for exchanging the heat, and most of the area of the upstream side and of the downstream side can be normally used.

Even if a difference develops in the temperature of the heat storage medium flowing through the small flow passages 20, the streams of medium are mixed together in the tubular headers 4, and the effect of the difference decreases. Such conditions stem from the condition where the hydrogen absorbing alloy powder is filled and from spatial difference such as absorbing-desorbing reaction performance.

Next, the tubular headers 4 are arranged in many stages in the up-and-down direction with predetermined gaps relative to each other, and the hydrogen absorbing alloy powder can be easily filled among the fins 3 through the gaps, offering a very excellent advantage in the filling operation. Further, the gaps, i.e., space where the headers used to be arranged in the prior art, can be filled with the hydrogen absorbing alloy powder, enabling the hydrogen absorbing alloy powder to be filled in an increased amount.

Besides, the flat tubes 2 need not be curved eliminating the difficulty of arranging the fins 3 at the curved portions which was a problem in the conventional curved flat tubes, and the heat-exchange performance can be enhanced.

Further, many thin fins 3 can be easily arranged using the constitution of the corrugated fins, and both ends of the fins 3 can be joined to the upper and lower flat tubes 2, making it possible to further enhance the heat-exchange performance.

In the present embodiment, the fins 30 at the uppermost positions and at the lowermost positions and on the outermost sides in the direction of width, are deviated more toward the central side in the right-and-left direction than the fins 3 on the outermost sides in the direction of width in the intermediate stages in the up-and-down direction. Therefore, even when the corners of the square can body 11 of the sealed casing 10 are curved, no gap forms between the heat-exchange unit 1a and the inner peripheral surfaces of the square can body 11, preventing a drop in the heat-exchange performance and in the strength.

In the present embodiment, further, the sealed casing 10 is provided with holder plates 9 for holding the tubular headers 4, the holder plates 9 being fastened to the closure plate 12 that closes the opening of the square can body 11 on the side of the tubular headers 4. Therefore, the sealed casing 10 and the heat-exchange units 1a are fabricated integrally together exhibiting increased resistance against vibration.

Further, the flat tubes 2 that extend horizontally suppress the sedimentation of the hydrogen absorbing alloy powder. Since the heat storage medium can be supplied to, and drained from, the apparatus from the same side, connection of the conduits is facilitated.

In the right-and-left and up-and-down cross section of the square cylindrical portion 11 as shown in FIG. 3, further, among the corrugated fins 3, the corrugated fins 30 of the uppermost stage and of the lowermost stage have a width narrower in the right-and-left direction than that of the corrugated fins 31 of the intermediate stages. Therefore, the corner portions (also referred to as curved corner portions) of the square cylindrical portion 11 can be curved in nearly a one-fourth circle at a predetermined curvature, making it possible to increase the resistance against the pressure of the square cylindrical portion 11 without increasing the thickness of the curved corner portions or of other flat plate portions of the square cylindrical portion 11.

Though the above-mentioned embodiment of the invention employs an aluminum alloy for forming the sealed casing 10, it is also possible to use a stainless steel or the like. Further, though the square cylindrical portion 11 was formed by extrusion molding, it may be formed by die casting.

While the invention has been described by reference to specific embodiments chosen for purposes of illustration, it should be apparent that numerous modifications could be made thereto by those skilled in the art without departing from the basic concept and scope of the invention.

What is claimed is:

1. An indirect heat exchanger filled with solid-gas reaction powdery particles comprising:
   an indirect heat exchanger which includes:
      a heat-exchange unit constituted by an upstream heat-exchange set having many flat tubes in many stages in the direction of height, said many flat tubes forming many small flow passages independently of one another and extending in the back-and-forth direction, and having fins extending in the back-and-forth direction maintaining a predetermined gap among said flat tubes neighboring up and down, and a downstream heat-exchange set, having the same structure as said upstream heat-exchange set, which is arranged close to the side of said upstream heat-exchange set in the direction of width;
      many tubular headers, extending in the direction of width, neighboring the ends on one side of said flat tubes to connect ends on one side of the pairs of the flat tubes at positions of equal heights of said two heat-exchange sets, and are arranged in the up-and-down direction at a predetermined distance;
      an upstream common header for commonly connecting the ends on the other side of said flat tubes of said upstream heat-exchange set; and a downstream common header for commonly connecting the ends on the other side of said flat tubes of said downstream heat-exchange set;

a sealed casing containing at least said heat-exchange unit and tubular headers of said indirect heat exchanger;

solid-gas reaction powdery particles filled in said sealed casing; and gas-transport tubes extending back-and-forth among said neighboring flat tubes penetrating through the end walls of said sealed casing in the back-and-forth direction to transport a gas that reacts with said solid-gas reaction powdery particles.

2. A heat exchanger according to claim 1, wherein:

the fins of the outermost sides in the direction of width arranged in the gaps between said sealed casing and said flat tubes are more deviated toward the central side in the right-and-left direction than are the fins of the outermost sides in the direction of width arranged among said flat tubes;

said sealed casing has a square can body opened at least on the side of said tubular headers and a closure plate for closing said opening; and the peripheral walls of said square can body include curved corner portions curved at a predetermined curvature and a total of four flat plate portions formed in nearly the shape of a flat plate among said curved corner portions.

3. A heat exchanger according to claim 1, wherein:

said sealed casing has a square can body opened at least on the side of said tubular headers and a closure plate for closing said opening; and said closure plate has holder plates that are provided to protrude inward and to hold said tubular headers in the direction of height.

* * * * *